(12) United States Patent
Kido et al.

(10) Patent No.: US 9,468,053 B1
(45) Date of Patent: Oct. 11, 2016

(54) LIGHTING DEVICE, LIGHT APPARATUS, AND SIGNBOARD APPARATUS

(71) Applicant: Panasonic Intellectual Property Management Co., Ltd., Osaka (JP)

(72) Inventors: Shojirou Kido, Osaka (JP); Yohei Hayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/075,396

(22) Filed: Mar. 21, 2016

(30) Foreign Application Priority Data

Apr. 3, 2015 (JP) ................................. 2015-077219

(51) Int. Cl.
| | | |
|---|---|---|
| *H05B 33/08* | (2006.01) | |
| *H05B 37/02* | (2006.01) | |
| *G09F 13/00* | (2006.01) | |
| *G09F 15/00* | (2006.01) | |

(52) U.S. Cl.
CPC ........... *H05B 33/0818* (2013.01); *G09F 13/00* (2013.01); *G09F 15/00* (2013.01); *H05B 33/0848* (2013.01); *H05B 37/0281* (2013.01); *H05B 33/0845* (2013.01)

(58) Field of Classification Search
USPC ................. 315/247, 185 S, 224, 209 R, 291, 315/307–326
See application file for complete search history.

(56) References Cited

U.S. PATENT DOCUMENTS

| | | | |
|---|---|---|---|
| 8,749,168 B2 | 6/2014 | Kamada et al. | |
| 8,810,155 B2 | 8/2014 | Kamada et al. | |
| 2008/0258641 A1 | 10/2008 | Nakagawa et al. | |
| 2013/0015784 A1 | 1/2013 | Kamada et al. | |
| 2013/0015785 A1 | 1/2013 | Kamada et al. | |
| 2015/0245432 A1* | 8/2015 | Ohtake .............. | H05B 33/0815 315/224 |

FOREIGN PATENT DOCUMENTS

| | | |
|---|---|---|
| JP | 2006-120910 A | 5/2006 |
| JP | 2008-206087 A | 9/2008 |
| JP | 2013-026690 A | 2/2013 |
| JP | 2013-026691 A | 2/2013 |
| JP | 2013-026692 A | 2/2013 |

* cited by examiner

*Primary Examiner* — Tuyet Vo
(74) *Attorney, Agent, or Firm* — Renner, Otto, Boisselle & Sklar, LLP

(57) ABSTRACT

A lighting device includes: a drive circuit that supplies power to a light source; a switch connected in series with the light source; and a controller that controls pulse modulation for visible light communication executed through switching ON and OFF of the switch in a first interval, and stops the pulse modulation in a second interval. The controller controls a peak value, which is a high value of a pulsed current supplied from the drive circuit to the light source, to match an average current value in the first interval with an average current value in the second interval.

11 Claims, 13 Drawing Sheets

LIGHTING DEVICE, LIGHT APPARATUS, AND SIGNBOARD APPARATUS

CROSS REFERENCE TO RELATED APPLICATION

This application claims the benefit of priority of Japanese Patent Application Number 2015-077219 filed on Apr. 3, 2015, the entire content of which is hereby incorporated by reference.

BACKGROUND

1. Technical Field

The present disclosure relates to a lighting device, a light apparatus, and a signboard device including plural light apparatuses.

2. Description of the Related Art

Japanese Unexamined Patent Application Publication No. 2006-120910 (Patent Literature (PTL) 1) discloses a semiconductor light-emitting element power supply that can modulate and drive a current-driven semiconductor light-emitting element, which (i) includes a voltage source having a controllable voltage and an average current detecting circuit that detects an average current flowing in a semiconductor light-emitting element, and (ii) controls an output voltage of the voltage source so that the average current detected by the average current detecting circuit becomes approximately constant. Accordingly, the average light-emission amount of the semiconductor light-emitting element is kept approximately constant whether the semiconductor light-emitting element is modulated and driven (i.e., data transfer is executed by visible light) or not.

SUMMARY

However, since PTL 1 keeps the average light-emission amount of the semiconductor light-emitting element approximately constant through feedback of the average current detected by the average current detecting circuit, there are cases where a fluctuation in the light-emission amount cannot be suppressed. For example, in the case where a period in which data transfer is executed and a period in which data transfer is not executed are alternately repeated, there is the problem that, when the response time of the feedback system is slow, the fluctuation in light-emission amount is not fully suppressed and, visually, flickering may occur.

Furthermore, assuming a collective signboard including plural light sources having a transmission function for visible light communication, there is the problem that the difference in brightness between a light apparatus that is executing a data transfer and a light apparatus that is not executing data transfer is conspicuous and gives a sense of incongruity.

The present disclosure provides a lighting device, a light apparatus, and a signboard apparatus which reduce the difference in average illuminance between adjacent light sources having a transmission function for visible light communication, and prevent the sense of incongruity.

A lighting device according to an aspect of the present disclosure includes: a drive circuit that supplies power to a light source; a switch connected in series with the light source; and a controller that controls pulse modulation for visible light communication executed through switching ON and OFF of the switch in a first interval, and stops the pulse modulation in a second interval, wherein the controller controls a peak value, which is a high value of a pulsed current supplied from the drive circuit to the light source, to match an average current value in the first interval with an average current value in the second interval.

Furthermore, a light apparatus according to an aspect of the present disclosure includes the lighting device and the light source.

Furthermore, a signboard apparatus according to an aspect of the present disclosure includes: a plurality of the light apparatuses; and a control apparatus that instructs visible light communication to each of the plurality of the light apparatuses, wherein the plurality of the light apparatuses are arranged as a collective signboard.

A lighting device, a light apparatus, and a signboard apparatus according to the present disclosure reduce the difference in average illuminance between adjacent light sources having a transmission function for visible light communication, and prevent the sense of incongruity.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, exemplary embodiments of the present disclosure shall be described in detail with reference to the drawings. It should be noted that each of the subsequently-described exemplary embodiments shows one specific example of the present disclosure. The numerical values, shapes, materials, structural components, the arrangement and connection of the structural components, etc. shown in the following exemplary embodiments are mere examples, and are not intended to limit the scope of the present disclosure.

Furthermore, among the structural components in the following exemplary embodiments, components not recited in any one of the independent claims which indicate the broadest concepts of the present disclosure are described as arbitrary structural components.

Embodiment 1

A lighting device, a light apparatus, and a signboard apparatus according to Embodiment 1 are described below.

[1.1 Structure of Signboard Apparatus]

Figure 1:
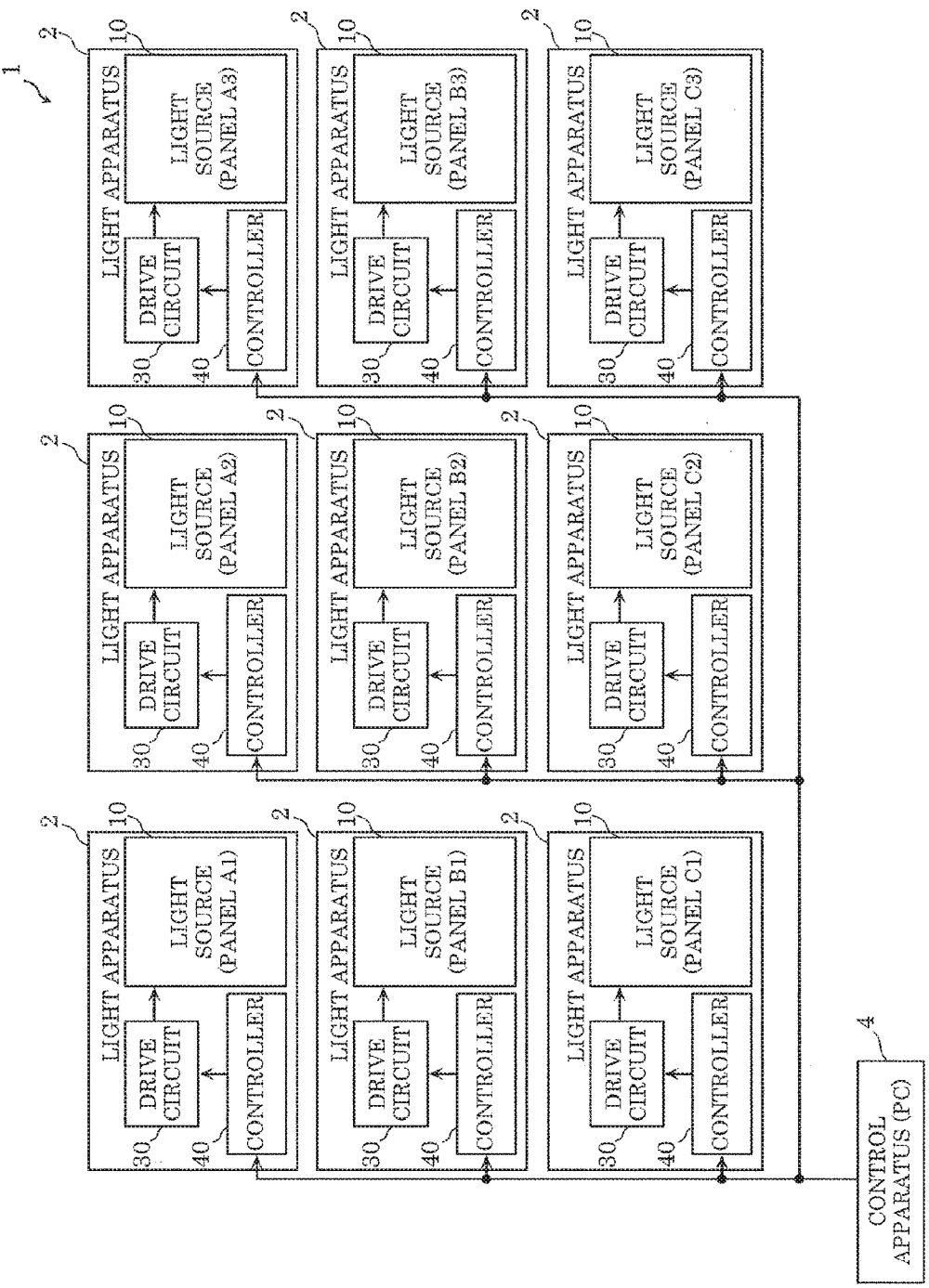
FIG. 1 is a block diagram illustrating an example configuration of a signboard apparatus according to Embodiment 1.

FIG. 1 is a block diagram illustrating an example configuration of signboard apparatus 1 according to Embodiment 1. Furthermore, as illustrated in FIG. 1, signboard apparatus 1 includes plural light apparatuses 2, and control apparatus 4.

Each of light apparatuses 2 is a light panel apparatus having a transmission function and a light-emitting face which are for visible light communication (VLC). Light apparatuses 2 are two-dimensionally arranged as a collective signboard.

Control apparatus 4 is, for example, a personal computer (PC), and is connected to light apparatuses 2 via communication lines. Control apparatus 4 controls the dimming and visible light communication of signboard apparatus 1 by transmitting various types of commands to signboard apparatus 1 via the communication lines. The various types of commands include, for example, a command instructing a dimming level and a command instructing the execution of visible light communication. It should be noted that communication between control apparatus 4 and light apparatuses 2 may be implemented by wired communication or wireless communication. Furthermore, control apparatus 4 performs exclusive control of the visible light communication transmission function of light apparatuses 2. In the exclusive control, control apparatus 4 causes each of light apparatuses 2 to execute the transmission function exclusively of a light apparatus 2 that is adjacent in a predetermined direction, and allows each of light apparatuses 2 to execute the transmission function simultaneously with a light apparatus 2 that is adjacent in a direction other than the predetermined direction. The predetermined direction is any one of the horizontal, vertical, and oblique directions, and it is sufficient to arbitrarily specify a direction in which the greatest number of adjacent light apparatuses 2 is present.

Such an exclusive control is for reducing misrecognition of optical signals from adjacent light apparatuses 2, and reducing deterioration of reading speed, that is, information recognition speed at the user-side.

In FIG. 1, each of light apparatuses 2 includes light source 10, drive circuit 30, and controller 40. It should be noted that light apparatuses 2 in the figure are referred to as panel A1, A2, ..., C3 when distinguishing one from the other.

Light source 10 is a panel-shaped light-emitting body. Light source 10 includes, for example, a tabular transparent resin board and plural light-emitting diodes (LEDs). The LEDs introduce light from the back or side of the transparent resin board so that light is emitted from the entire front face (outer surface) of the transparent resin board. A guide for a shop or other type of advertisement, for example, is depicted on the front face of the transparent resin board as a signboard. It should be noted that light source 10 is not limited to a combination of the transparent resin board and plural LEDs, and may be an organic electroluminescent (EL) panel as long as it is a light-emitting body capable of visible light communication.

Drive circuit 30 supplies power of a value corresponding to the dimming level of light source 10, according to an instruction (analog dimming signal) from controller 40, and executes pulse modulation as a visible light communication transmission function, according to an instruction (pulse modulation signal) from controller 40. The pulse modulation may be, for example, the 4-value pulse position modulation (4PPM) defined in the "Visible Light ID System" (CP-1222) standard of the Japan Electronics and Information Technology Industries Association (JEITA). In 4PPM, for example, one symbol time is 0.416 ms and one slot time is 0.104 ms. Since one symbol is represented by two bits, the bit rate is 4.8 kbps. In order to increase lighting time percentage, the pulse modulation according to this embodiment may be the I4PPM (inverted 4-value pulse position modulation) obtained by inverting the 4PPM.

Controller 40 is a microcomputer, and transmits an analog dimming signal and a pulse modulation signal to drive circuit 30 according to a command from control apparatus 4. An analog dimming signal is a signal for indicating the dimming level and the magnitude of the constant current. A pulse modulation signal is a signal for the above-described I4PPM. Pulse modulation is executed in an interval instructed in a command from control apparatus 4. An interval in which pulse modulation is executed is called a modulation interval, and an interval in which pulse modulation is not executed is called a pause interval. In the subsequent description, the modulation interval is also called a first interval, and the pause interval is also called a second interval.

Furthermore, controller 40 causes drive circuit 30 to repeat the modulation interval and the pause interval, according to a command from control apparatus 4. At this time, controller 40 controls a peak value, which is the high value of the pulsed current to be supplied from drive circuit 30 to light source 10, in order to match the average current value in the modulation interval with the average current value in the pause interval. Specifically, controller 40 causes drive circuit 30 to increase the peak value at the start of the modulation interval, and causes drive circuit 30 to restore the peak value at the start of the pause interval. For example, controller 40 causes the peak value in the modulation interval to be a value obtained by dividing the average current value in the pause interval by the pulse modulation duty cycle. Here, duty cycle refers to the duty cycle of a pulse modulation signal, and is equivalent to (ON time/(ON time+OFF time)) of a switch for switching ON and OFF the current to light source 10. In the above-described I4PPM, the duty cycle is a constant value of 75%. In this case, the value obtained by dividing the average current value in the pause interval by the duty cycle is 1.33 times the average current value in the pause interval.

According to such control of the peak value of current in the modulation interval, it is possible to reduce the difference in average illuminance between the modulation interval and the pause interval of light apparatuses 2, and prevent the sense of incongruity. In addition, since controller 40 controls drive circuit 30 at the starting point of each of the modulation interval and the pause interval instead of using the feedback method in which the current value is controlled by detecting the average current value, it is possible to suppress fluctuations and flickering caused by response delays.

It should be noted that when the pulse modulation is other than I4PPM and the duty cycle is not constant, an average duty cycle may be estimated in advance and an estimated value that is assumed to be constant may be used.

[1.2 Structure of Signboard System]

Next, a structure of a signboard system according to this embodiment will be described.

Figure 2:
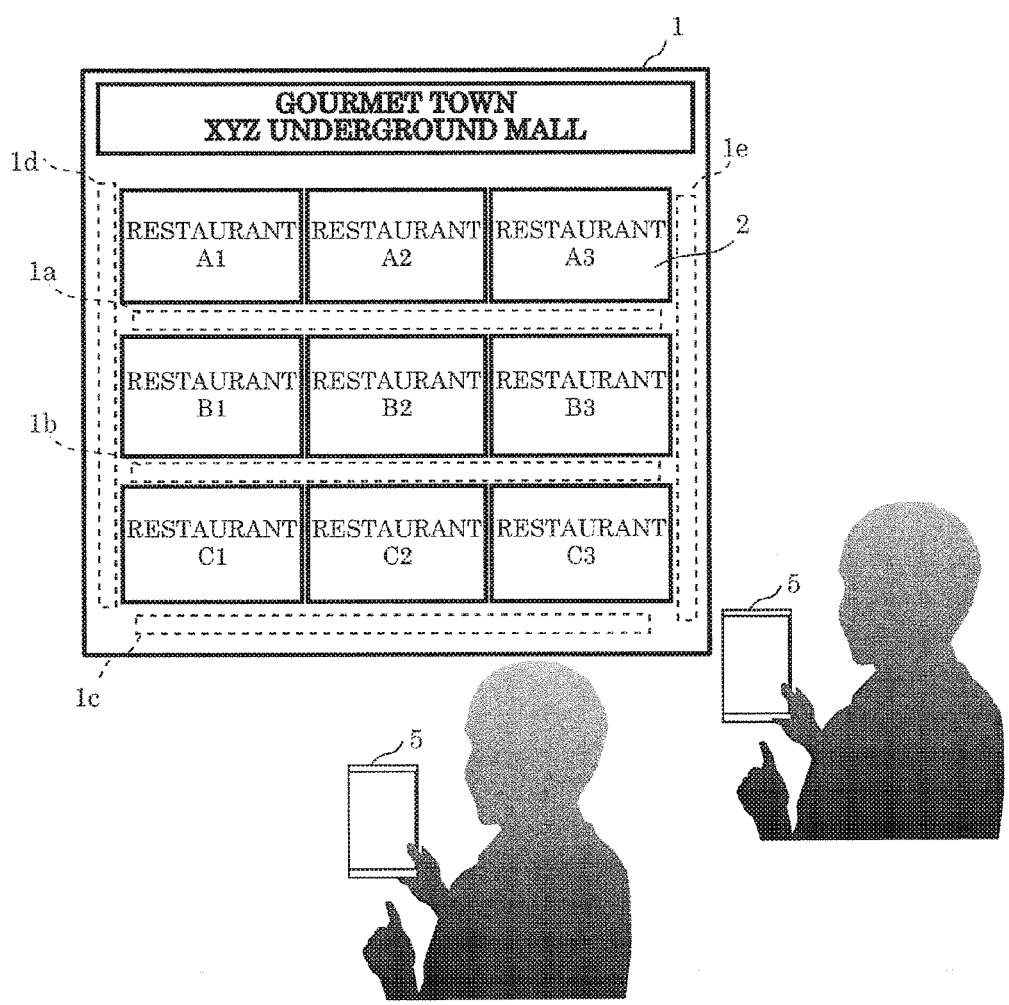
FIG. 2 is an external view of an example of a signboard apparatus according to Embodiment 1.

FIG. 2 is an external view of an example of a signboard system according to Embodiment 1. As illustrated in FIG. 2, the signboard system includes signboard apparatus 1 and plural portable devices 5.

Although the light-emitting faces of respective light apparatuses 2 are arranged in a matrix of 3 rows by 3 columns in the example of FIG. 2, the arrangement is not limited to a matrix. For example, the arrangement may be in a shape, size, and positioning matching a floor layout. Furthermore, the sizes of the respective light-emitting faces need not be the same.

Each of portable devices 5 is, for example, a smartphone or tablet terminal device, and has a camera through which visible light communication is received.

Furthermore, signboard apparatus 1 in FIG. 2 includes, on the front face of the layout of light apparatuses 2 (light panel apparatuses), invitation displays (e.g., 1a to 1e) having an icon or a guidance message inviting the receiving of visible light communication. Each of invitation displays 1a to 1e includes, for example, icons or invitation messages such as "Visible light communication ongoing; detailed attached information receivable by smartphone.", "Please activate app and point camera toward desired restaurant signboard.", "Hold smartphone upright and take a photo of a restaurant signboard to view suggested menu.", "Hold smartphone sideways and hold camera up to a restaurant signboard", "Visible light communication-capable.", and so on. Accordingly, a user of portable device 5 can obtain, as detailed restaurant information, for example, a uniform resource locator (URL) of the restaurant, an image of the restaurant interior, a recommended menu, prices, available seating, waiting time, a discount coupon, etc.

As in the case of invitation displays 1a to 1c, plural invitation displays may be placed at approximately equal intervals, between light-emitting faces.

[1.3 Structure of Light Apparatus]

Next, the structure of light apparatus 2 as a light panel apparatus will be described.

Figure 3:
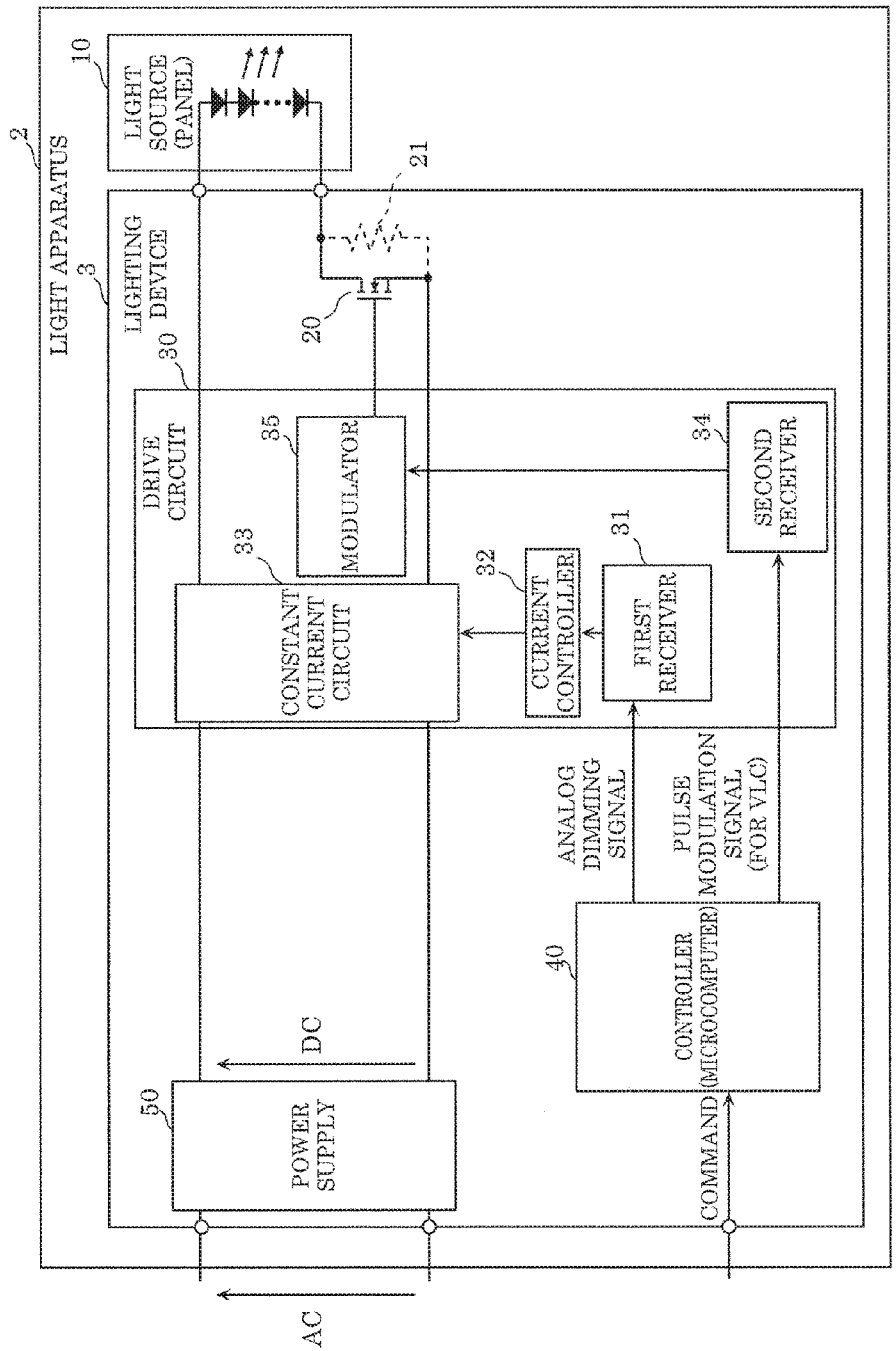
FIG. 3 is a block diagram illustrating an example configuration of a light apparatus according to Embodiment 1.

FIG. 3 is a block diagram illustrating a more detailed example configuration of light apparatus 2 according to Embodiment 1. As illustrated in the figure, light apparatus 2 includes light source 10 and lighting device 3.

Light source 10 is, as already described, a panel-shaped light-emitting body, Lighting device 3 includes switch 20, resistor 21, drive circuit 30, controller 40, and power supply 50.

Switch 20 switches ON and OFF the current to be supplied to light source 10 from drive circuit 30. The ON and OFF switching pulse-modulates the visible light from light source 10. This pulse modulation is, for example, the above-described I4PPM.

Resistor 21 is connected in parallel with switch 20, and connected in series with light source 10. Resistor 21 can pass current to light source 10 when switch 20 is OFF. In the aforementioned pulse modulation, light source 10 is switched rapidly between the two states of "dark light-emission" and "bright light-emission", in accordance with the switching ON and OFF of switch 20. The level of the "dark light-emission" can be determined according to the resistance of resistor 21. When visible light is to be 100% modulated (i.e., when "dark light-emission" is replaced with "no light-emission"), resistor 21 need not be included, and thus is illustrated in phantom as optional. It should be noted that an LED may be included in place of resistor 21.

Drive circuit 30 includes first receiver 31, current controller 32, constant current circuit 33, second receiver 34, and modulator 35.

First receiver 31 receives the analog dimming signal from controller 40, and instructs the dimming level to current controller 32.

Current controller 32 instructs, to constant current circuit 33, the magnitude of the constant current that constant current circuit 33 is required to supply to light source 10, according to the dimming level instructed by first receiver 31.

Constant current circuit 33 supplies light source 10 with constant current of the magnitude instructed by current controller 32.

Second receiver 34 receives the pulse modulation signal for visible light communication from controller 40, converts the level of the pulse modulation signal, and outputs the result to modulator 35.

Modulator 35 outputs to switch 20 a switch driving signal which causes switch 20 to switch ON and OFF, according to the pulse modulation signal from second receiver 34.

Controller 40, as already described, generates and outputs, to drive circuit 30, an analog dimming signal and a pulse modulation signal, according to a command from control apparatus 4.

Power supply 50 is an alternating current-to-direct current (AC-DC) converter and includes a power factor correction (PFC) circuit and a harmonic reduction circuit.

Next, the current supplied to light source 10 in the modulation interval (first interval) and the pause interval (second interval) will be described.

Figure 4:
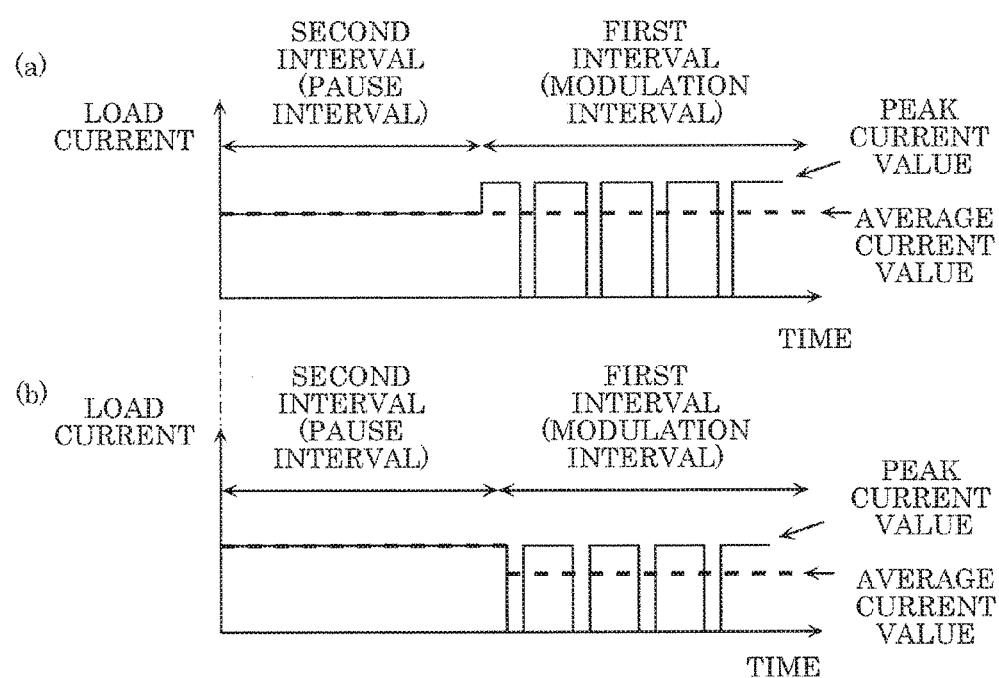
FIG. 4 illustrates time charts of example waveforms of current flowing in a light source in each of a modulation interval and a pause interval according to Embodiment 1.

FIG. 4 illustrates time charts for examples of current waveforms of light source 10 in the modulation interval and the pause interval according to Embodiment 1. In FIG. 4, (a) is a time chart for the case where the average current value in the modulation interval is matched with the current value in the pause interval. In FIG. 4, (b) is a time chart for the case where the average current value in the modulation interval is not matched with the current value in the pause interval.

As in (a) and (b) in FIG. 4, pulse modulation for visible light communication is not executed in the pause interval. In the pause interval, constant current is supplied from constant current circuit 33 to light source 10. The magnitude of the constant current can be changed by controller 40, first receiver 31, and current controller 32, according to a command instructing the dimming level from control apparatus 4.

As in (a) and (b) in FIG. 4, pulse modulation is executed in the modulation interval. The pulse modulation is executed through the switching ON and OFF of switch 20 according to the pulse modulation signal from controller 40.

In (a) in FIG. 4, the peak current value is increased in order to match the average current value in the modulation interval with the current value in the pause interval. This is implemented by controller 40 outputting an analog dimming signal at the start of the pulse modulation interval to change the dimming level to a value obtained by dividing the dimming level in the pause interval by the duty in the modulation interval. By doing so, the average brightness in the pause interval and the modulation interval are made the same even when the cycles of the pause interval and the modulation interval are long or when the modulation is deep (100% modulation, etc.), and thus visual flickering can be suppressed.

On the other hand, in (b) in FIG. 4, the peak current value in the modulation interval is the same as the average current value in the pause interval. As such, there are instances where the difference in brightness between the pause interval and the modulation interval is conspicuous in the form of visual flickering. In order to reduce flickering, it is sufficient to raise the frequency of the repetition of the pause interval and the modulation interval. For example, when the frequency is greater than or equal to 60 Hz, visual flickering can be suppressed. It should be noted that the frequency may be deliberately lowered (for example, less than or equal to 30 Hz). Accordingly, by causing visual flickering to occur, the panel that is executing visible light communication within signboard apparatus 1 can be specified.

[2.1 Operation of Light Apparatus]

The operation of signboard apparatus 1 configured in the manner described above will be described.

Figure 5:
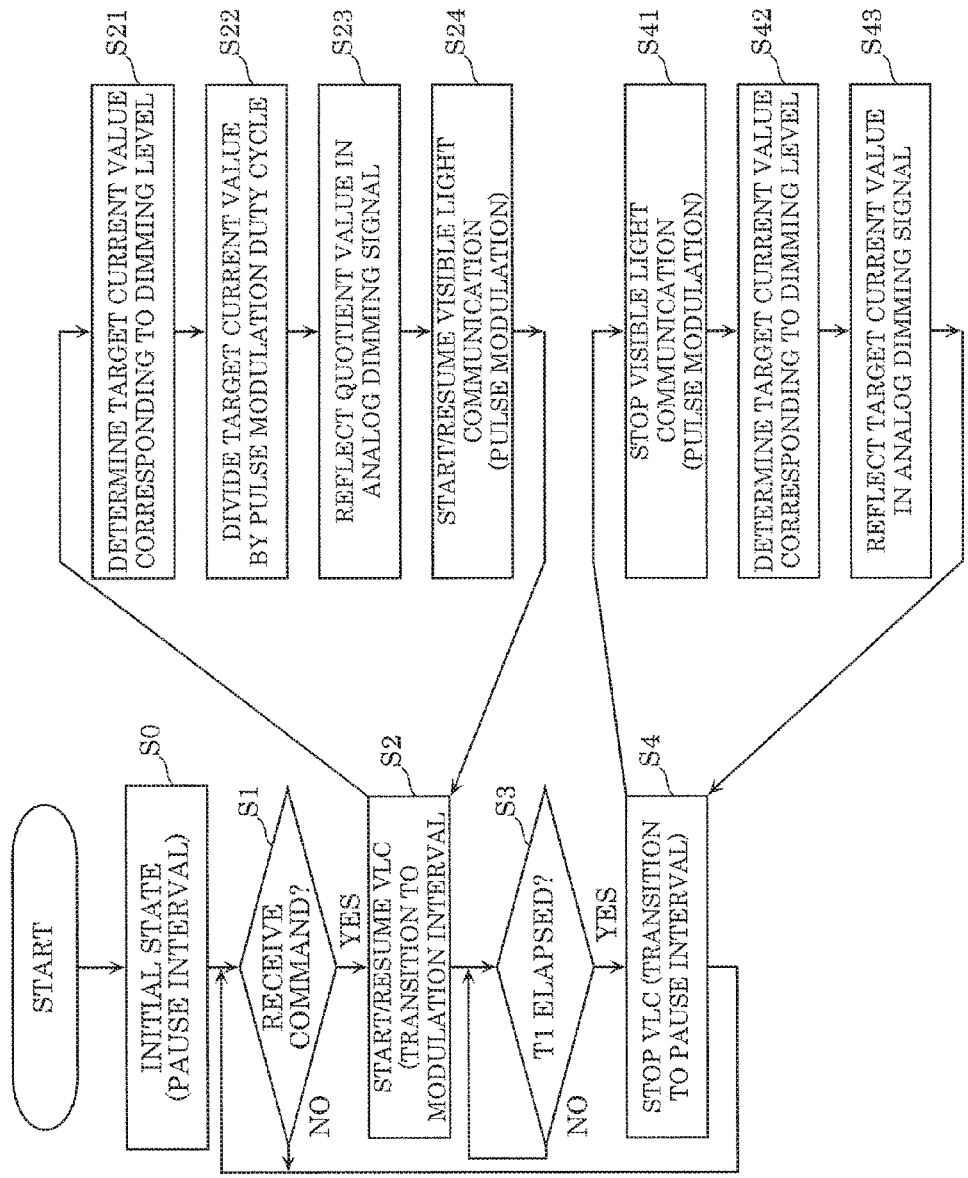
FIG. 5 is a flowchart illustrating an example process by a controller according to Embodiment 1.

FIG. 5 is a flowchart illustrating an example process of controller 40 according to Embodiment 1.

First, light apparatus 2 pauses visible light communication in an initial state immediately after power supply is introduced (S0). Specifically, modulator 35 stops modulation at the initial state. In this state, when controller 40 receives a command instructing the execution of visible light communication from control apparatus 4 (YES in S1), controller 40 starts or resumes visible light communication, that is, transitions from the pause interval to the modulation interval (S2). In addition, when time T1, which is the length of the modulation interval, elapses (YES in S3), controller 40 stops the visible light communication, that is, transitions from the modulation interval to the pause interval (S4). With this, light apparatus 2 executes visible light communication only in the period of time T1 from when the command is received, as the modulation interval, and does not execute visible light communication in a period other than the modulation interval, as the pause interval.

Next, the transition from the pause interval to the modulation interval in step S2 will be described in detail. In step S2, controller 40 determines a target current value corresponding to the present dimming level, or in other words, determines the current value presently being supplied from drive circuit 30 to light source 10 in the pause interval. Controller 40 divides the determined target current value by the duty cycle of the pulse modulation (S22). In the case of I4PPM, the quotient value becomes 1.33 times the target current value. In addition, controller 40 reflects the quotient value in the analog dimming signal, and outputs this signal to drive circuit 30 (S23). With this, the current to be supplied from drive circuit 30 to light source 10 becomes a value obtained by dividing the average current value in the pause interval by the duty cycle of the pulse modulation signal in the modulation interval. In the case of I4PPM, the current to be supplied becomes 1.33 times the average current value in the pause interval. In addition, controller 40 starts or resumes the pulse modulation for the visible light communication (S24).

Next, the transition from the modulation interval to the pause interval in step S4 will be described in detail. In step S4, controller 40 stops the pulse modulation for the visible light communication (S41). In addition, controller 40 determines a target current value corresponding to the dimming level in the immediately preceding pause interval. This determining may use a value which is the stored target current value in step S21 or may use a value obtained by multiplying the present (i.e., in the modulation interval) target current value by the aforementioned duty cycle. In addition, controller 40 reflects the target current value determined in step S42 in the analog dimming signal, and outputs this signal to drive circuit 30 (S43). With this, the value of the current to be supplied from drive circuit 30 to light source 10 returns to a value that is the same as that in the immediately preceding pause interval.

In this manner, controller 40 controls the peak value, which is the high value of the pulsed current to be supplied from drive circuit 30 to light source 10, in order to match the average current value in the modulation interval with the average current value in the pause interval. By doing so, it is possible to reduce the difference in average illuminance between the first interval and the second interval in light apparatus 2, and prevent the sense of incongruity. In addition, since controller 40 controls drive circuit 30 at the starting point of each of the modulation interval and the pause interval instead of using the feedback method in which the current value is controlled by detecting the average current value, it is possible to suppress fluctuations and flickering caused by response delays.

It should be noted that although the modulation factor of the pulse modulation is 100%, that is, the light-ON state and the light-OFF state are used in I4PPM, the modulation factor may be other than 100%. Furthermore, instead of I4PPM, InPPM (where n is an integer greater than or equal to 2) may be used, or a different pulse modulation may be used.

Furthermore, light apparatus 2 is not limited to the internally illuminated type, and may be of the externally illuminated type.

Embodiment 2

A signboard apparatus and a signboard system according to Embodiment 2 are described below. The structure of signboard apparatus 1 according to this embodiment is the same as according to Embodiment 1. In this embodiment, the times of the modulation interval (first interval) and the pause interval (second interval) are particularly defined.

Figure 6:
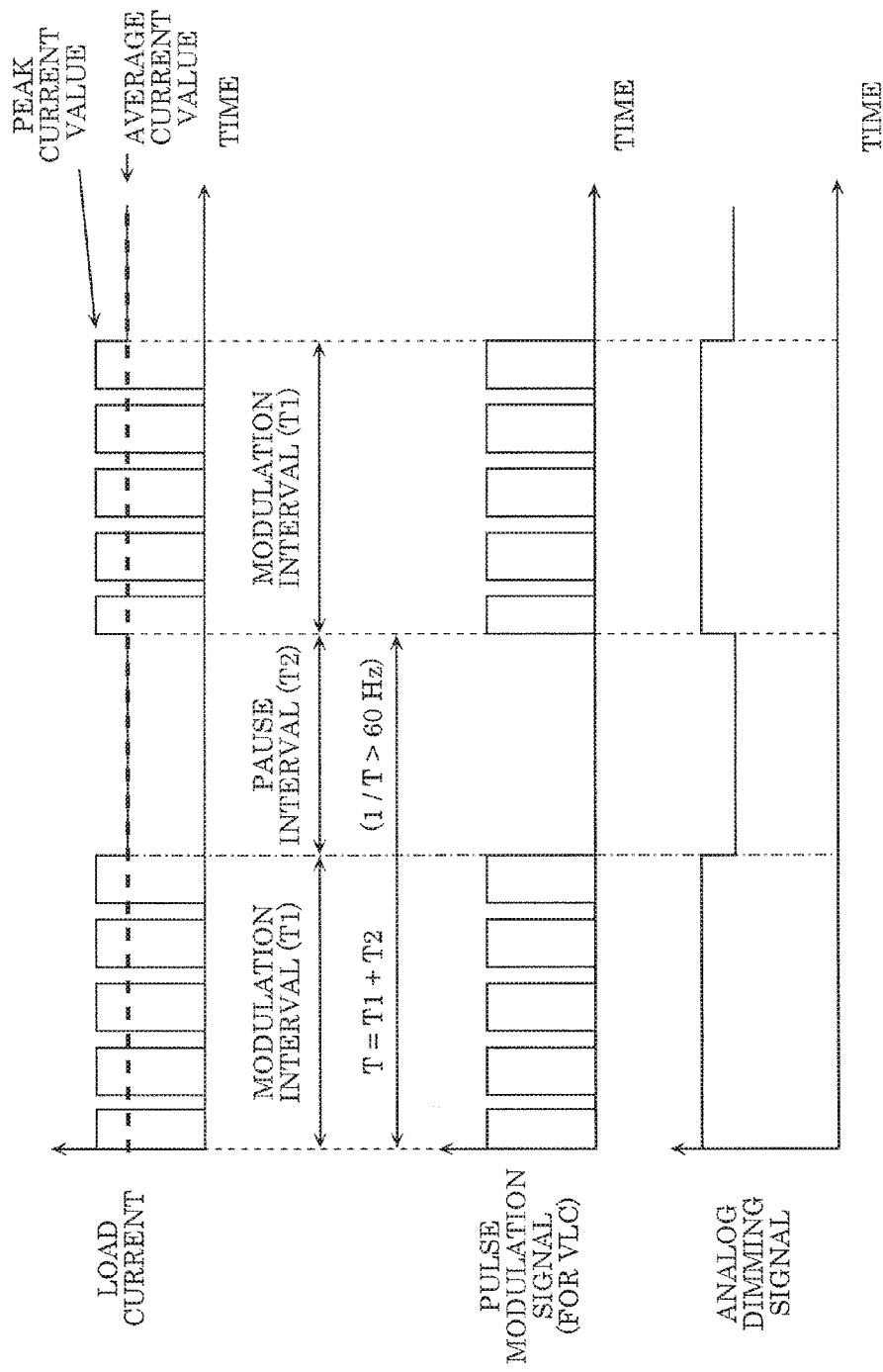
FIG. 6 is a time chart illustrating example waveforms of current flowing in a light source according to Embodiment 2.

FIG. 6 is a time chart illustrating example waveforms of current flowing in a light source according to Embodiment 2. The figure illustrates waveforms of a load current, a pulse modulation signal, and an analog dimming signal are illustrated in the figure.

The load current is the current flowing in the load, that is, light source 10. As described according to Embodiment 1, the peak current value in the modulation interval is set so that the average current value in the modulation interval matches the average current value in the pause interval.

A pulse modulation signal and an analog dimming signal are outputted from controller 40 to drive circuit 30.

In the figure, the modulation interval is set to be T1 seconds and the pause interval is set to be T2 seconds. In this embodiment, 1/(T1+T2) is greater than or equal to 60 Hz. By doing so, visual flickering caused by the difference in brightness between the modulation interval and the pause interval can be reduced and made inconspicuous.

Embodiment 3

A signboard apparatus and a signboard system according to Embodiment 3 are described below. The structure of signboard apparatus 1 according to this embodiment is substantially the same as according to Embodiment 1 but different in that the width of the inverted pulse in 14PPM is smaller than the slot width. Hereinafter, description will be carried out focusing on the points of difference.

Figure 7:
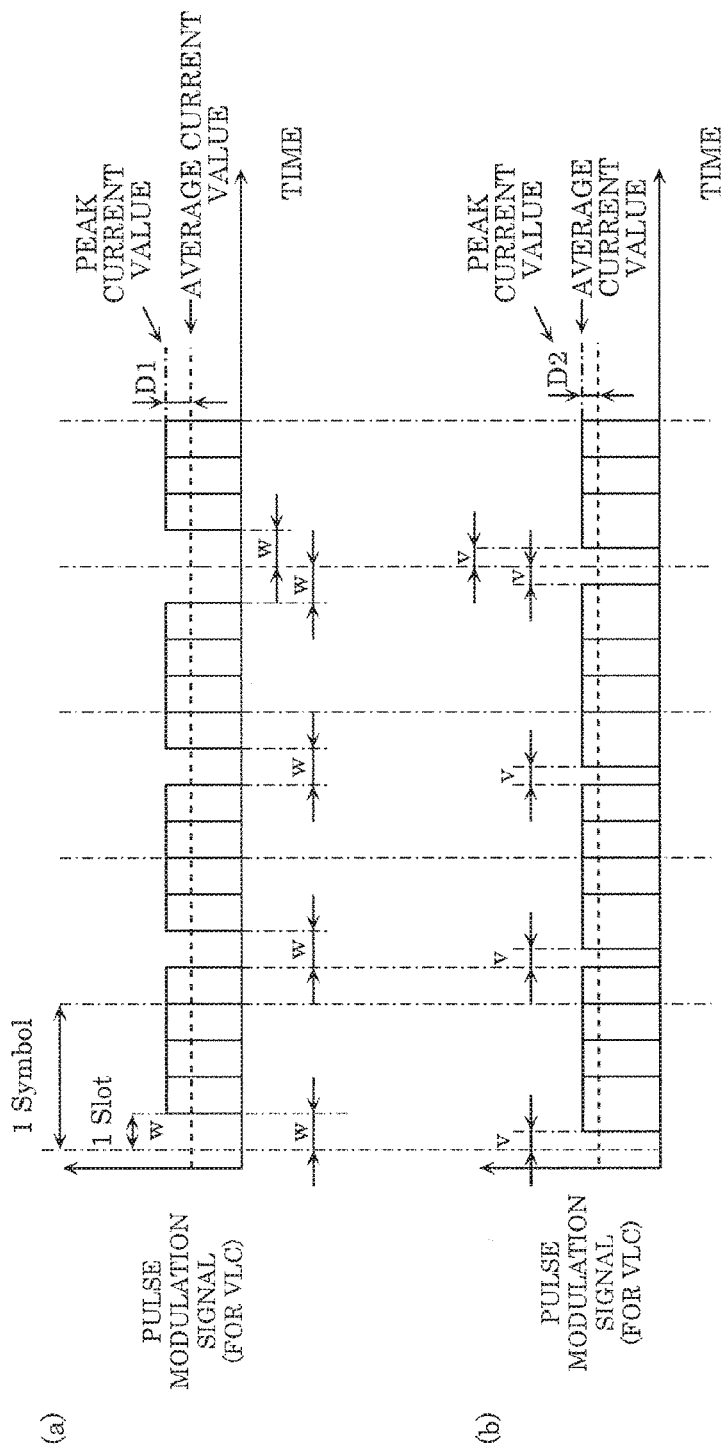
FIG. 7 illustrates time charts for example pulse modulation according to Embodiment 3.

FIG. 7 illustrates time charts for an example pulse modulation according to Embodiment 3. Here, (a) in FIG. 7 corresponds to Embodiment 1, and (b) in FIG. 7 corresponds to Embodiment 3.

In (a) in FIG. 7, the pulse modulation signal is an inverted 4-pulse position modulation (I4PPM) signal, and one symbol period is divided into four slot periods. One slot period w is ¼ of one symbol period. The width of the inverted pulse is equal to one slot period w.

In contrast, in (b) in FIG. 7, the pulse modulation signal is also an I4PPM signal, but inverted pulse width v is smaller than one slot period w. Specifically, the inverted pulse width v is approximately ½ to ⅓ of one slot period w. For example, when one slot period w is 0.104 ms, it is sufficient that the inverted pulse width v be 0.05 ms. Controller 40 makes inverted pulse width v smaller than one slot period w by adjusting the position of at least one of the front edge (falling edge) and the back edge (rising edge) of an inverted pulse in the pulse modulation signal.

By doing so, difference D2 between the peak current value and the average current value in (b) in FIG. 7 becomes smaller than difference D1 between the peak current value and the average current value in (a) in FIG. 7. Stated differently, the duty cycle of the pulse modulation signal in (b) in FIG. 7 is bigger, and thus the peak current value can be made smaller. Specifically, in the transition from the pause interval to the modulation interval, the fluctuation in the current supplied from drive circuit 30 to light source 10 can be made smaller (i.e., difference D2<difference D1), and the flickering caused by the current fluctuation and the sense of incongruity caused by the difference in brightness with the surroundings can be reduced. The flickering described here includes flickering caused by overshoot occurring mainly in the pulse waveform at the time of transitioning from the pause interval to the modulation interval.

Embodiment 4

Next, a signboard apparatus and a signboard system according to Embodiment 4 are described below. The structure of signboard apparatus 1 according to this embodiment is substantially the same as according to Embodiment 1 but is different in that control to make the peak current value bigger in the modulation interval (first interval) is not performed, and in that switch 20 is controlled to switch ON and OFF at a frequency different from the frequency of the pulse modulation in the modulation interval and with a duty cycle identical to the duty cycle of the pulse modulation, in the pause interval (second interval). Hereinafter, description is carried out focusing on the points of difference.

Figure 8:
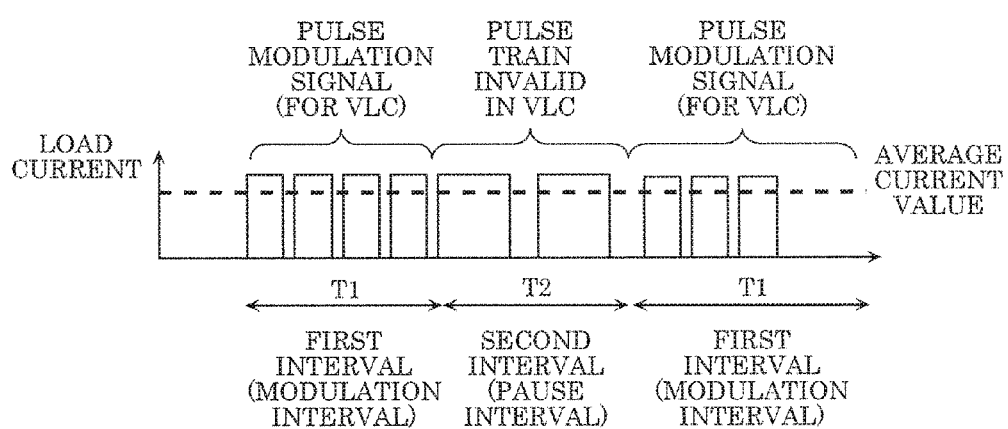
FIG. 8 is a time chart illustrating an example waveform of current flowing in a light source in each of a modulation interval and a pause interval according to Embodiment 4.

FIG. 8 is a time chart illustrating an example waveform of current flowing in a light source in each of a modulation interval and a pause interval according to Embodiment 4.

First, since control for making the peak current value larger in the modulation interval is not performed, the analog dimming signal to be outputted from controller 40 to drive circuit 30 is the same signal for the modulation interval and the pause interval. As a result, as illustrated in FIG. 8, the peak current values in the modulation interval and the pause interval have the same magnitude.

Furthermore, since controller 40 controls the switching ON and OFF of switch 20 even in the pause interval, the load current becomes a pulse train even in the pause interval. This pulse train is controlled so as to have a frequency different from the frequency of the pulse modulation in the modulation interval and have a duty cycle identical to the duty cycle of the pulse modulation. As a result, the average current values of the modulation interval and the pause interval have the same magnitude.

Accordingly, it is possible to reduce the difference in average illuminance between the modulation interval and the pause interval and suppress the visual sense of incongruity, without controlling the peak current value in the modulation interval.

Furthermore, in the pause interval, controller 40 causes switch 20 to switch ON and OFF to cause the generation of a pulse train that is to be judged as invalid in visible light communication. By doing so, it becomes possible to avoid erroneously receiving, as visible light communication data, the pulse train in the pause interval.

Embodiment 5

Next, a signboard apparatus and a signboard system according to Embodiment 5 are described below.

Figure 9:
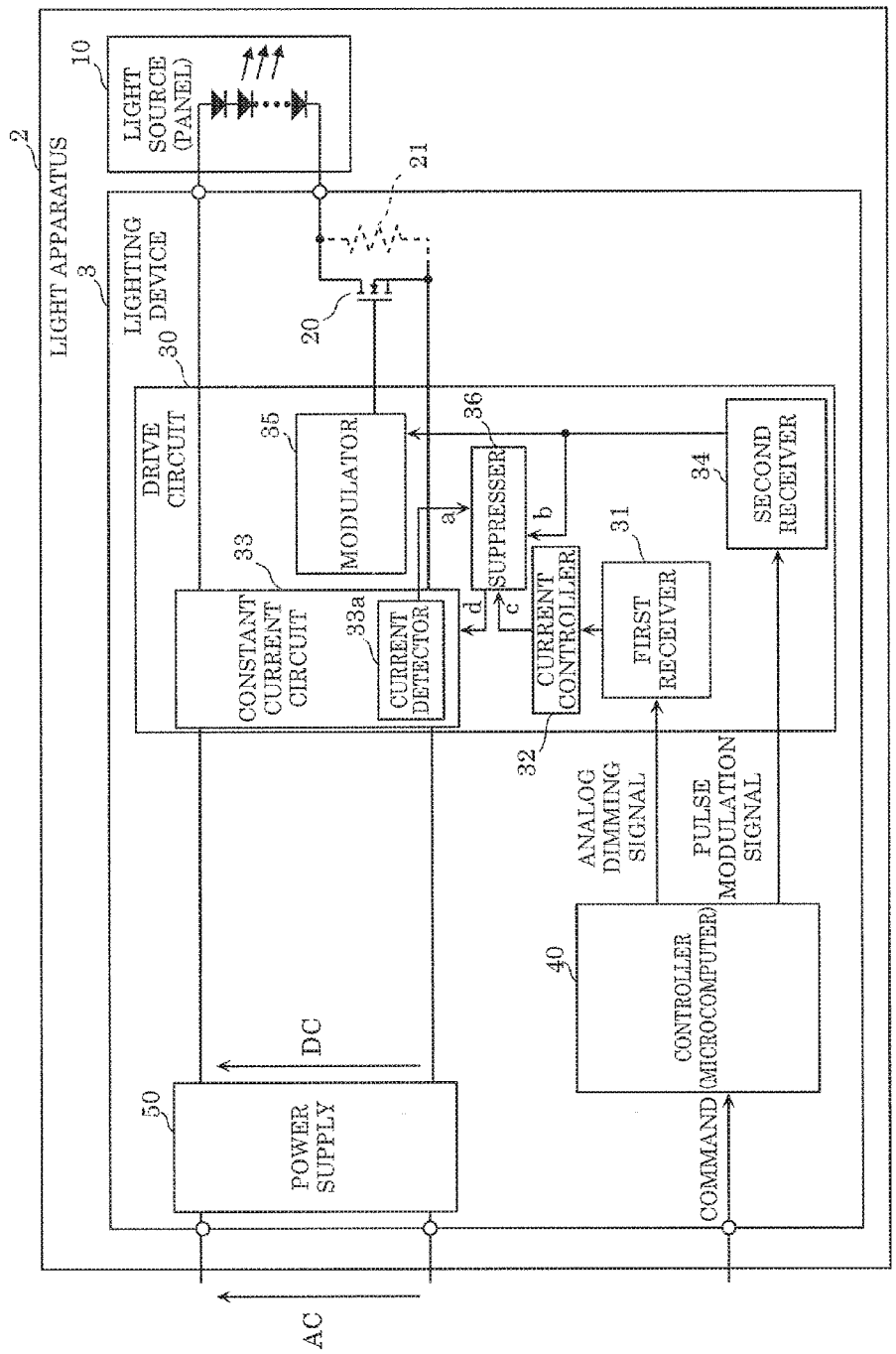
FIG. 9 is a block diagram illustrating an example configuration of a light apparatus according to Embodiment 5.

FIG. 9 is a block diagram illustrating an example configuration of signboard apparatus 2 according to Embodiment 5. Compared to FIG. 3, signboard apparatus 1 in the figure is different in that current detector 33a and suppresser 36 are added. Hereinafter, description is carried out focusing on the points of difference.

Current detector 33a and suppresser 36 are provided in order to suppress an overshoot which tends to occur with the load current at the time of transitioning from the pause interval to the modulation interval.

Figure 10:
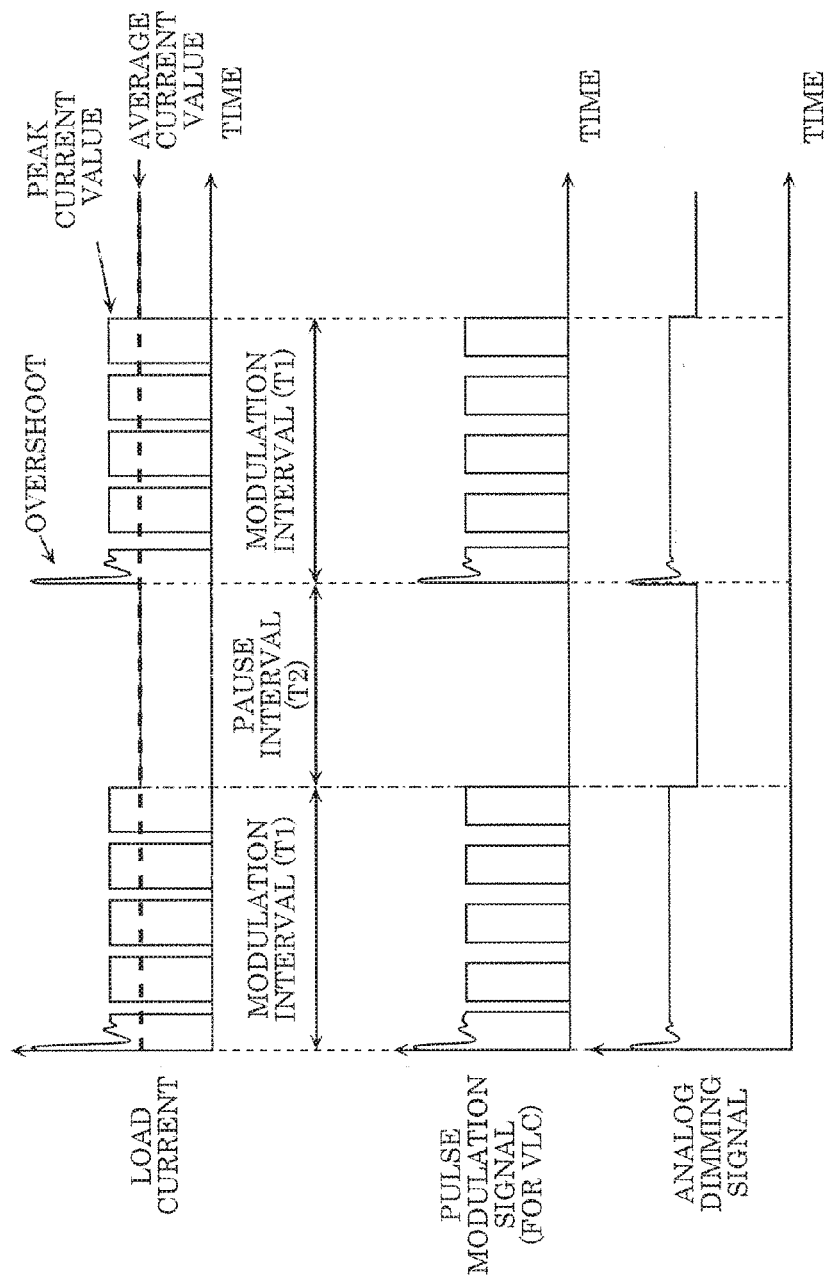
FIG. 10 is a time chart illustrating example current waveforms in each of a modulation interval and a pause interval in a comparative example.

FIG. 10 is a time chart illustrating example current waveforms in each of a modulation interval and a pause interval in a comparative example. The figure illustrates waveforms of a load current, a pulse modulation signal, and an analog dimming signal. An overshoot, though dependent on the circuit structure, can more or less occur at the rising edge of each of the signals. In particular, since the fluctuation is big at the rising edge at the time of transitioning from the pause interval to the modulation interval, a big overshoot tends to occur. In FIG. 10, the overshoot at the rising edge at the time of transitioning from the pause interval to the modulation interval is illustrated schematically with emphasis.

Current detector 33a detects the current value of current supplied to light source 10.

Suppresser 36 performs sampling and holding of the current value detected at the time of switching from the pause interval to the modulation interval, and suppresses the overshoot in the pulsed current supplied to light source 10 based on the difference between the held value and a value indicated in a command value signal. Here, the command value signal is a signal which corresponds to the above-described analog dimming signal and indicates the magnitude of the current that drive circuit 30 is required to supply to light source 10.

Next, a detailed example configuration of suppresser 36 will be described.

Figure 11:
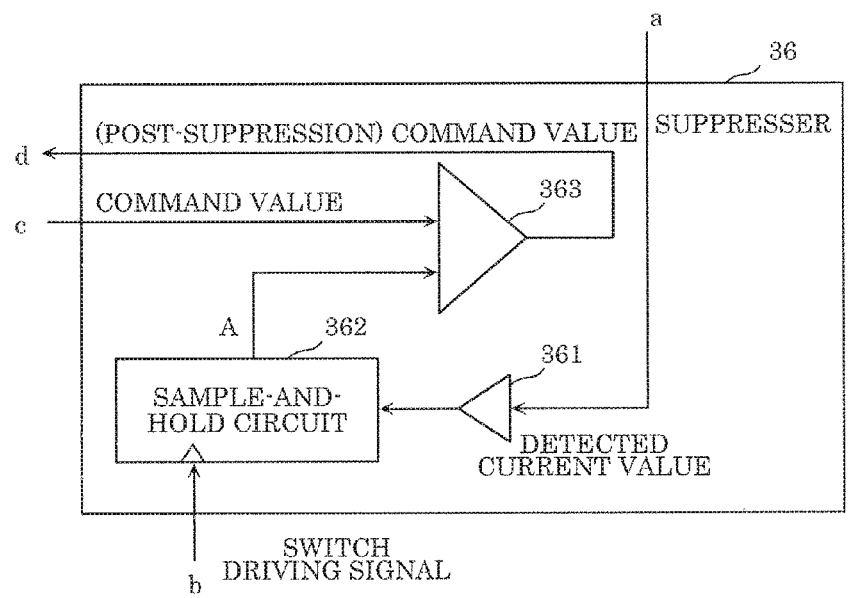
FIG. 11 is a block diagram illustrating an example configuration of a suppresser according to Embodiment 5.

FIG. 11 is a block diagram illustrating an example configuration of suppresser 36 according to Embodiment 5. As illustrated in the figure, suppresser 36 includes amplifier circuit 361, sample-and-hold circuit 362, and error amplifier circuit 363. In FIG. 11 and FIG. 9, a, b, and c are assigned to a detected current value, a switch driving signal, a command value signal, and a post-suppression command value signal, respectively.

Amplifier circuit 361 amplifies the detected current value detected by current detector 33a.

Sample-and-hold circuit 362 samples the amplified detected current value from amplifier circuit 361, at the rise of the switch driving signal (i.e., at the timing when switch 20 switches from ON to OFF), and holds the sampled value.

Error amplifier circuit 363 amplifies the error between the command value signal from controller 40 and the value held by sample-and-hold circuit 362, and outputs the amplified error as a post-suppression command value to constant current circuit 33.

Accordingly, the detected current value is sampled at the timing when switch 20 switches from ON to OFF and this detected current value is held, and thus, at the timing when switch 20 switches from OFF to ON, instead of feeding back the drastically changing detected current value itself (i.e., the detected current value having the overshoot), the held value is fed back to error amplifier circuit 363. As a result, it is possible to suppress the overshoot occurring at the timing when switch 20 switches from OFF to ON.

Figure 12:
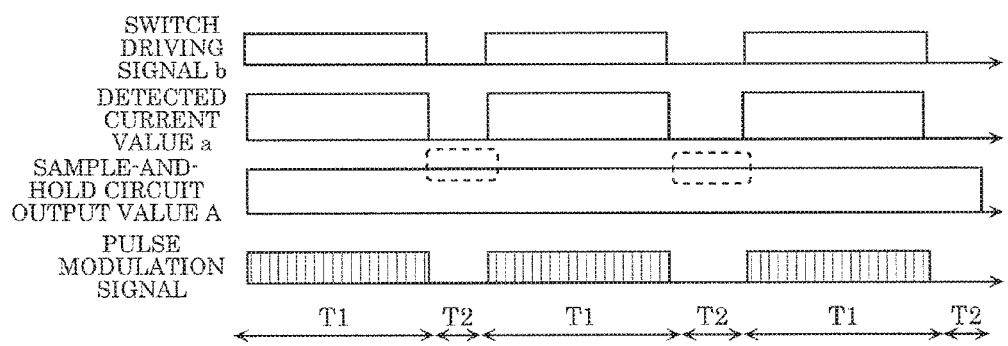
FIG. 12 is a time chart illustrating operation of the suppresser according to Embodiment 5.

FIG. 12 is a time chart illustrating operation of suppresser 36 according to Embodiment 5. The figure illustrates switch driving signal a, detected current value b, output value A (i.e., the held value) of sample-and-hold circuit 362, and a pulse modulation signal in modulation interval T1 and pause interval T2. An overshoot tends to occur at the rise of detected current value a, but because output value A of sample-and-hold circuit 362 is the value obtained by the sampling and holding at the fall, as indicated by the broken line frames, the drastic change of detected current value a is suppressed. The drastic change of the command value outputted from error amplifier circuit 363 is also suppressed, and the drastic change of the load current flowing in light source 10 is suppressed.

As described above, signboard apparatus 1 according to this embodiment is capable of suppressing an overshoot of the load current flowing in light source 10 from the pause interval to the modulation interval, and suppressing the visual flickering caused by the overshoot.

Modifications

It should be noted that, in each of the foregoing embodiments, control apparatus 4 may perform exclusive control to cause each of light apparatuses 2 to execute the transmission function exclusively of an adjacent light apparatus 2.

Figure 13:
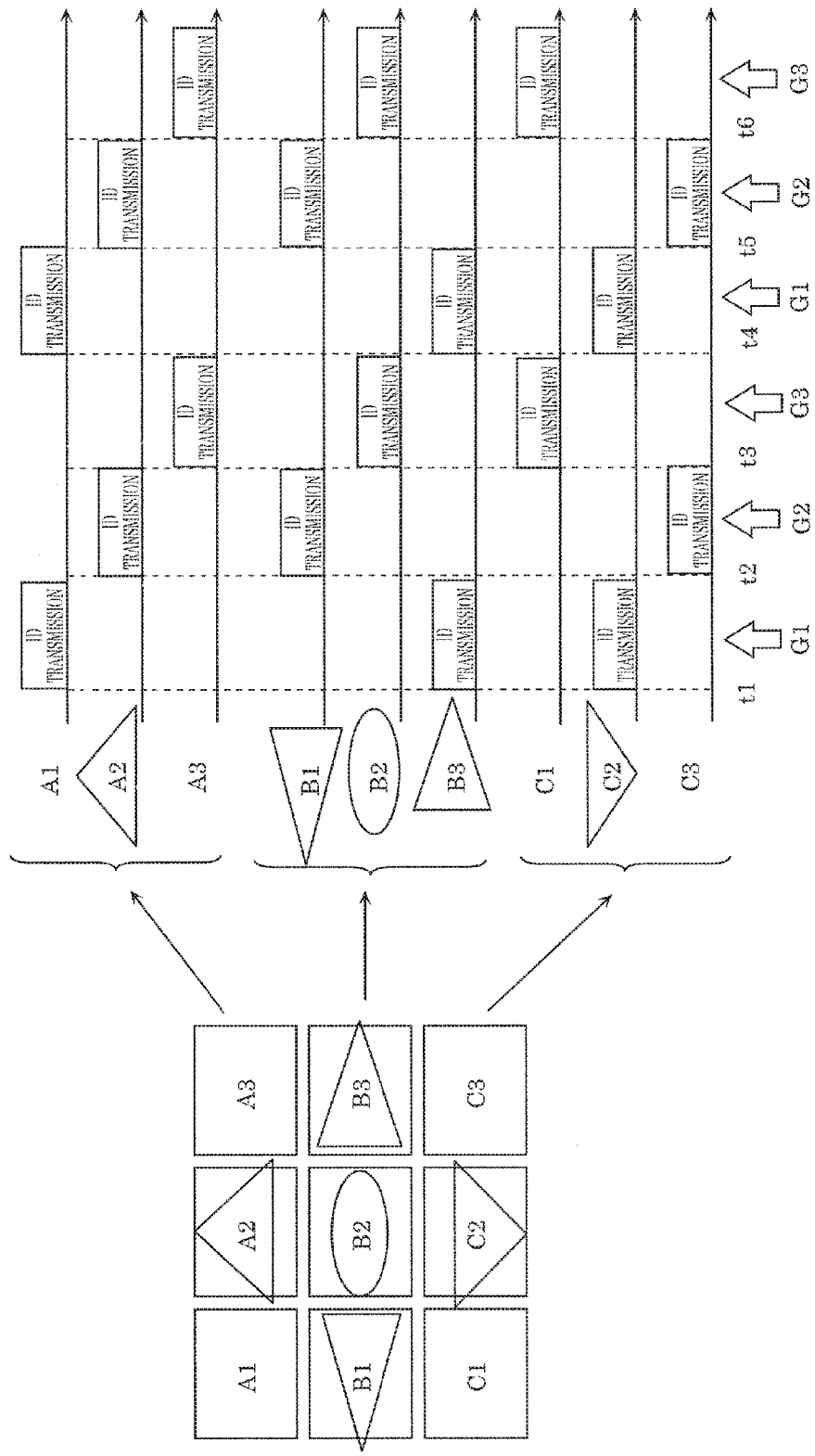
FIG. 13 is a time chart illustrating an example of exclusive control of plural light apparatuses according to Embodiment 1.

FIG. 13 is a time chart illustrating the exclusive control performed on light apparatuses 2. The arrangement of light apparatuses 2 in FIG. 1 and FIG. 2 (denoted here as panels A1 to A3, B1 to B3, and C1 to C3) is illustrated on the left side of FIG. 13. Time charts depicting the modulation intervals (the "ID transmission" intervals in the figure) for each panel are illustrated on the right side of FIG. 13.

Controller 4 classifies panels into groups and stores the classification. In the figure, group G1 is composed of panels A1, B3, and C2. Group G2 is composed of panels A2, B1, and C3. Group G3 is composed of panels A3, B2, and C1. Specifically, the grouping into groups G1 to G3 is carried out so that each of the panels executes the transmission function exclusively of a vertically or horizontally adjacent panel.

At time t1, control apparatus 4 transmits a command instructing the start of modulation, to panels A1, B3, and C2 belonging to group G1. Accordingly, panels A1, B3, and C2 transition from the pause interval to the modulation interval. In this modulation interval, the other panels that are vertically or horizontally adjacent to each of panels A1, B3, and C2 are in the pause interval. Subsequently, each of panels A1, B3, and C2 transition from the modulation interval to the pause interval after a fixed time elapses. The fixed time is a time less than or equal to t2−t1.

In addition, at time t2, control apparatus 4 transmits a command instructing the start of modulation, to panels A2, B1, and C3 belonging to group G2. Accordingly, panels A2, B1, and C3 transition from the pause interval to the modulation interval. In this modulation interval, the other panels that are vertically or horizontally adjacent to each of panels A2, B1, and C3 are in the pause interval. Subsequently, each of panels A2, B1, and C3 transition from the modulation interval to the pause interval after the fixed time elapses.

In addition, at time t3, control apparatus 4 transmits a command instructing the start of modulation, to panels A3, B2, and C1 belonging to group G3. Accordingly, panels A3, B2, and C1 transition from the pause interval to the modulation interval. In this modulation interval, the other panels that are vertically or horizontally adjacent to each of panels A3, B2, and C1 are in the pause interval. Subsequently, each of panels A3, B2, and C1 transition from the modulation interval to the pause interval after the fixed time elapses.

From time t4 onward, control apparatus 4 repeats the command transmission in times t1 to t3 in the same manner.

In this manner, control apparatus 4 can easily implement exclusive control by merely storing groups corresponding to the exclusive control, and transmitting a command instructing the start of a modulation interval, to each of the groups. Accordingly, during the receiving of visible light communication, it is possible to reduce misrecognition, and reduce deterioration of the reading speed, that is, information recognition speed at the portable device-side.

It should be noted that the transition from the modulation interval to the pause interval may be triggered by a command from control apparatus 4 instead of the elapse of a fixed time. Furthermore, the length of the modulation interval for the respective groups need not be the same, and may be different for each of the groups.

It should be noted that light apparatus 2 in FIG. 3 may include a constant voltage circuit in place of constant current circuit 33. An example configuration of light apparatus 2 in this case will be described.

Figure 14:
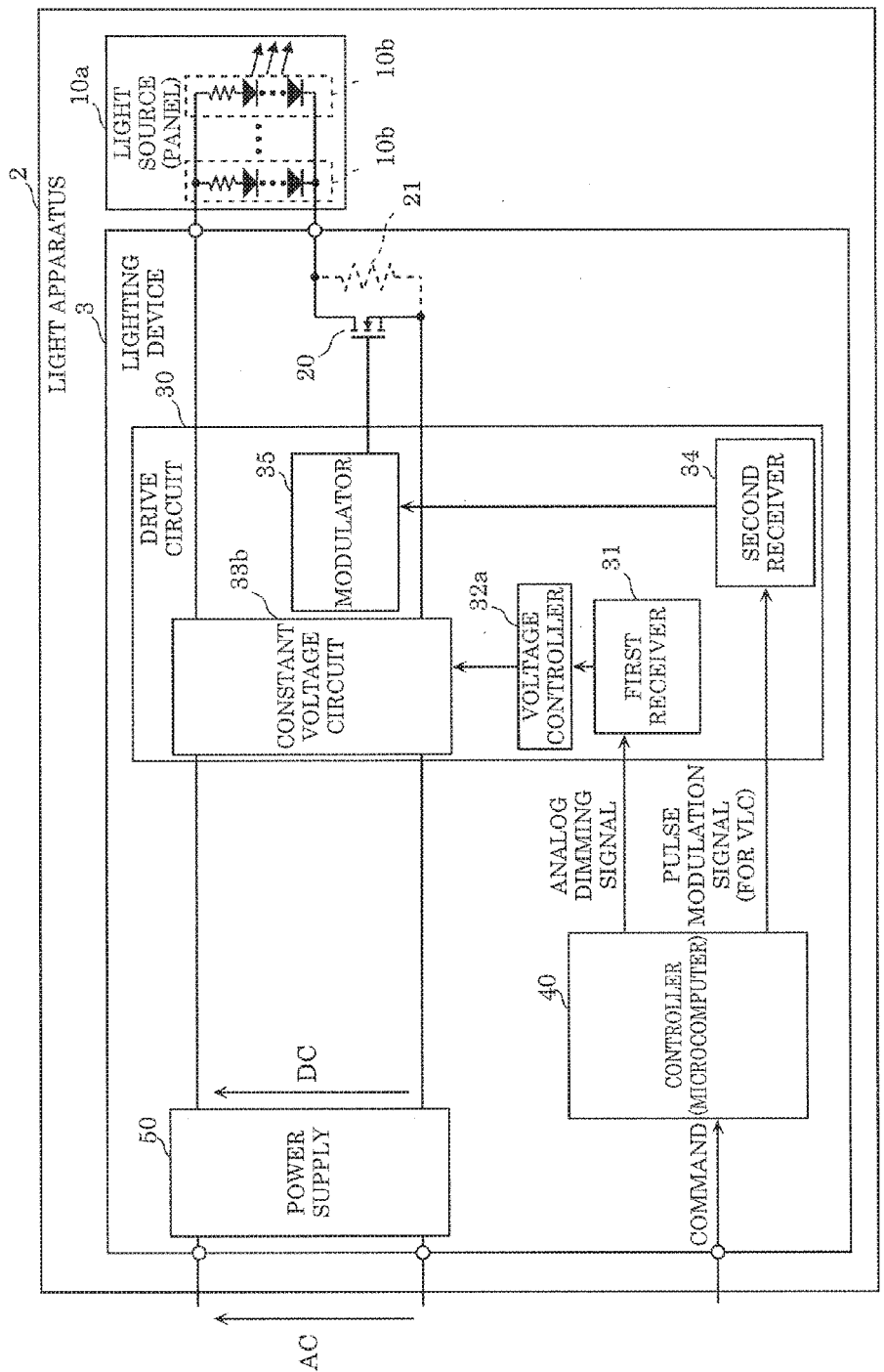
FIG. 14 is a block diagram illustrating another example configuration of a light apparatus.

FIG. 14 is a block diagram illustrating another example configuration of light apparatus 2. Compared to FIG. 3, light apparatus 2 in FIG. 14 is different in terms of including voltage controller 32a, constant voltage circuit 33b, and light source 10a, in place of current controller 32, constant current circuit 33, and light source 10. Hereinafter, description is carried out focusing on the points of difference.

Voltage controller 32a instructs, to constant voltage circuit 33b, the magnitude of the constant voltage that constant voltage circuit 33b should supply to light source 10a, according to the dimming level instructed by first receiver 31.

Constant voltage circuit 33b supplies the constant voltage to light source 10a. However, this constant voltage is controlled to be a voltage of the magnitude instructed by voltage controller 32a.

Light source 10a includes plural light-emitting circuits 10b which are connected in parallel. Each of light-emitting circuits 10b includes plural LEDs and a resistance element. The LEDs and the resistance element are connected in series. The resistance element is provided for controlling the current flowing in light-emitting circuit 10b.

Drive circuit 30, whether in a configuration including constant current circuit 33 as in FIG. 3 or a configuration including constant voltage circuit 33b as in FIG. 14, supplies power of a magnitude that is in accordance with the dimming level to light source 10 or light source 10*a*, respectively.

It should be noted that light apparatus 2 in FIG. 14 may include current detector 33*a* and suppresser 36 in FIG. 9. In this case, it is sufficient that the output signal of voltage controller 32*a*, that is, the signal instructing the magnitude of the constant voltage be converted to a signal instructing the magnitude of the constant current.

As described above, lighting device 3 according to one or more of the exemplary embodiments includes: drive circuit 30 that supplies power to a light source (10 or 10*a*); switch 20 connected in series with the light source (10 or 10*a*); and controller 40 that controls pulse modulation for visible light communication executed through switching ON and OFF of switch 20 in a first interval, and stops the pulse modulation in a second interval, wherein controller 40 controls a peak value, which is a high value of a pulsed current supplied from drive circuit 30 to the light source (10 or 10*a*), to match an average current value in the first interval with an average current value in the second interval.

Accordingly, it is possible to reduce the difference in average illuminance between the first interval and the second interval in light apparatus 2, and prevent the sense of incongruity.

Here, controller 40 may cause drive circuit 30 and switch 20 to cyclically repeat of the first interval and the second interval.

Accordingly, it is possible to reduce visual flickering occurring due to the difference in average illuminance between the first interval and the second interval in light apparatus 2, and prevent the sense of incongruity.

Here, controller 40 may cause drive circuit 30 to increase the peak value at a start of the first interval and restore the peak value at a start of the second interval.

Accordingly, since controller 40 controls drive circuit 30 at the starting point of each of the first interval and the second interval instead of using the feedback method in which the current value is controlled by detecting the average current value, it is possible to suppress fluctuations and flickering caused by response delays.

Here, controller 40 may cause the peak value in the first interval to be a value obtained by dividing the average current value in the second interval by a duty cycle of a pulse modulation signal for the first interval.

Accordingly, since the duty cycle of the pulse modulation signal can be handled as a constant value, current can be controlled with high precision at the starting point of each of the first interval and the second interval.

Here, in the second interval, controller 40 may cause switch 20 to switch ON and OFF at a frequency different from a frequency of the pulse modulation in the first interval and with a duty cycle identical to a duty cycle of the pulse modulation.

Accordingly, it is possible to reduce the difference between in average illuminance between the first interval and the second interval and prevent the sense of incongruity, without having to control the peak current value in the first interval.

Here, in the second interval, controller 40 may cause switch 20 to switch ON and OFF to generate a pulse train that is invalid in the visible light communication.

Accordingly, it becomes possible to avoid erroneously receiving, as visible light communication data, the pulse train in the second interval.

Here, controller 40 may cause the first interval and the second interval to be cyclically generated, and where the first interval is T1 seconds and the second interval is T2 seconds, $1/(T1+T2)$ may be greater than or equal to 60 Hz.

Accordingly, it is possible to reduce visual flickering caused by the difference in brightness between the first interval and the second interval.

Here, the pulse modulation may be an inverted pulse position modulation in which a value of one symbol is represented by a position of an inverted pulse in slots, and the inverted pulse may have a width smaller than a slot width.

Accordingly, since the duty cycle of the pulse modulation signal is made bigger, the illuminance in the first interval can be raised.

Here, controller 40 outputs, to drive circuit 30, a command value signal indicating a magnitude of current that drive circuit 30 is required to supply to light source 10, and drive circuit 30 includes: current detector 33 that detects a current value of the current supplied to light source 10; and suppresser 36 that performs sampling and holding of the current value detected at a time of transitioning from the second interval to the first interval, and suppresses an overshoot in the pulsed current to be supplied to light source 10, based on a difference between the current value held in the sampling and holding and a value indicated by the command value signal.

Accordingly, it is possible to suppress visual flickering caused by an overshoot.

Furthermore, light apparatus 2 according to one or more of the exemplary embodiments includes lighting device 2 and light source 10 (10*a*).

Furthermore, signboard apparatus 1 according to one or more of the exemplary embodiments includes: light apparatuses 2; and control apparatus 4 that instructs visible light communication to each of light apparatuses 2, wherein light apparatuses 2 are arranged as a collective signboard.

Although the signboard apparatus according to the present disclosure has been described based on exemplary embodiments, the present disclosure is not limited to these embodiments. Forms obtained by various modifications to the exemplary embodiments that can be conceived by a person of skill in the art as well as other forms realized by combining part of the structural components in the exemplary embodiments and modifications, which are within the scope of the essence of the present disclosure are included in the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device comprising:
    a drive circuit that supplies power to a light source;
    a switch connected in series with the light source; and
    a controller that controls pulse modulation for visible light communication executed through switching ON and OFF of the switch in a first interval, and stops the pulse modulation in a second interval,
    wherein the controller controls a peak value, which is a high value of a pulsed current supplied from the drive circuit to the light source, to match an average current value in the first interval with an average current value in the second interval.

2. The lighting device according to claim 1,
wherein the controller causes the peak value in the first interval to be a value obtained by dividing the average current value in the second interval by a duty cycle of a pulse modulation signal for the first interval.

3. The lighting device according to claim 1,
wherein the controller causes the first interval and the second interval to be cyclically generated, and
where the first interval is T1 seconds and the second interval is T2 seconds, 1/(T1+T2) is greater than or equal to 60 Hz.

4. The lighting device according to claim 1,
wherein the pulse modulation is an inverted pulse position modulation in which a value of one symbol is represented by a position of an inverted pulse in a plurality of slots, and
the inverted pulse has a width smaller than a slot width.

5. The lighting device according to claim 1,
wherein the controller outputs, to the drive circuit, a command value signal indicating a magnitude of current that the drive circuit is required to supply to the light source, and
the drive circuit includes:
  a detector that detects a current value of the current supplied to the light source; and
  a suppresser that performs sampling and holding of the current value detected at a time of transitioning from the second interval to the first interval, and suppresses an overshoot in the pulsed current to be supplied to the light source, based on a difference between the current value held in the sampling and holding and a value indicated by the command value signal.

6. The lighting device according to claim 1,
wherein the controller causes the drive circuit and the switch to cyclically repeat the first interval and the second interval.

7. The lighting device according to claim 6,
wherein the controller causes the drive circuit to increase the peak value at a start of the first interval and restore the peak value at a start of the second interval.

8. The lighting device according to claim 1,
wherein, in the second interval, the controller causes the switch to switch ON and OFF at a frequency different from a frequency of the pulse modulation in the first interval and with a duty cycle identical to a duty cycle of the pulse modulation.

9. The lighting device according to claim 8,
wherein, in the second interval, the controller causes the switch to switch ON and OFF to generate a pulse train that is invalid in the visible light communication.

10. A light apparatus comprising the lighting device and the light source according to claim 1.

11. A signboard apparatus comprising:
a plurality of the light apparatuses according to claim 10; and
a control apparatus that instructs visible light communication to each of the plurality of the light apparatuses,
wherein the plurality of the light apparatuses are arranged as a collective signboard.

* * * * *